No. 11,977. Reissued Mar. 25, 1902.

G. C. TILYOU.

AMUSEMENT DEVICE.

(Application filed Nov. 2, 1901.)

2 Sheets—Sheet 1.

WITNESSES:

C. H. Bertholf

F. T. Wentworth

INVENTOR

George C. Tilyou

BY

Nathaniel L. Frothingham

ATTORNEY

No. 11,977. Reissued Mar. 25, 1902.

G. C. TILYOU.

AMUSEMENT DEVICE.

(Application filed Nov. 2, 1901.)

2 Sheets—Sheet 2.

WITNESSES:

C. H. Berthold

F. T. Wentworth

INVENTOR

George C. Tilyou

BY

Nathaniel L. Frothingham.

ATTORNEY

UNITED STATES PATENT OFFICE.

GEORGE C. TILYOU, OF CONEY ISLAND, NEW YORK.

AMUSEMENT DEVICE.

SPECIFICATION forming part of Reissued Letters Patent No. 11,977, dated March 25, 1902.

Original No. 648,813, dated May 1, 1900. Application for reissue filed November 2, 1901. Serial No. 80,963.

*To all whom it may concern:*

Be it known that I, GEORGE C. TILYOU, a citizen of the United States, residing at Coney Island, in the borough of Brooklyn, city of New York, county of Kings, and State of New York, have invented certain new and useful Improvements in Amusement Devices, of which the following is a specification, reference being had therein to the accompanying drawings.

The invention relates to an amusement device especially adapted for application to the floors, passages, or stairways of buildings for the purpose of startling and amusing persons who inadvertently step upon it; and it has for its object the production of an amusement device of the character described which can be applied to a building in the desired relation without attracting the attention to it and without endangering the person or apparel of those who pass over or upon it.

A further object is to provide a device of this character which will be simple in its construction and arrangement of parts and which can be easily operated and not readily disarranged and rendered inoperative.

The invention consists in the novel features of construction and arrangement of parts hereinafter set forth and described, and more particularly pointed out in the claims hereto appended.

Figure 1:
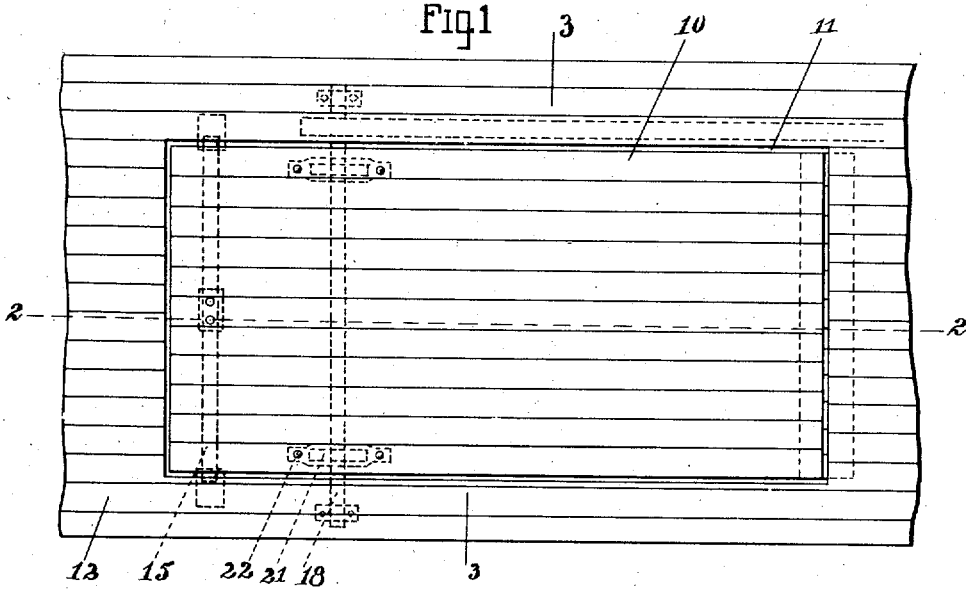
Figure 2:
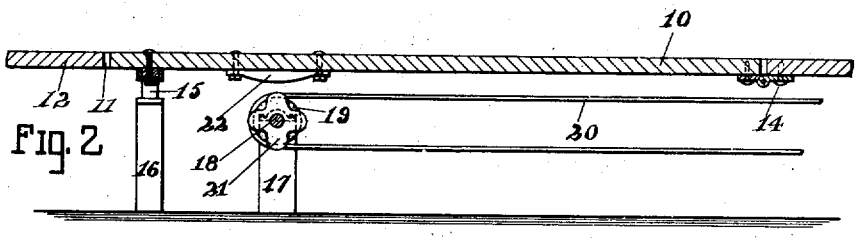
Figure 3:
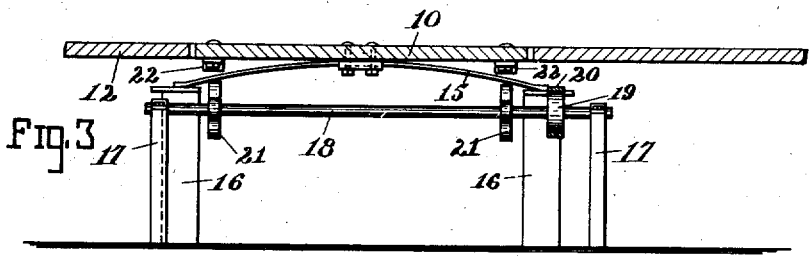
Figure 4:
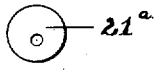
Figure 5:
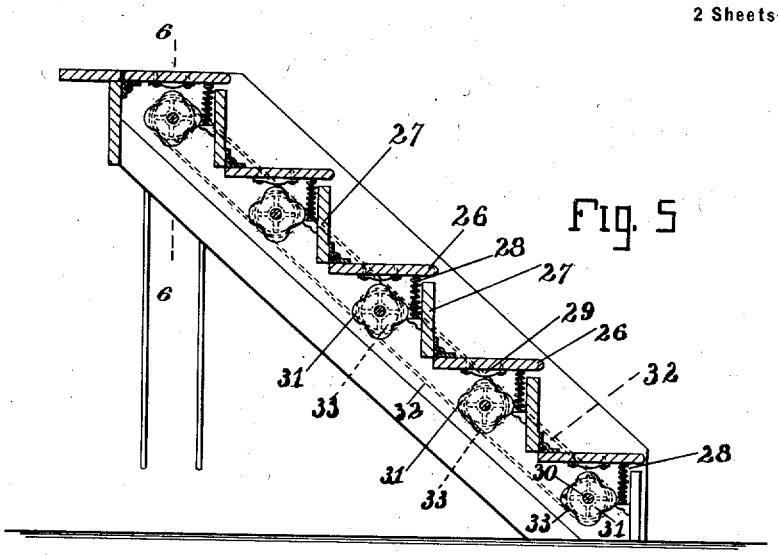

Referring to the drawings, Figure 1 is a plan view of my amusement device as applied to a floor or passage. Fig. 2 is a longitudinal sectional elevation on the line 2 2 of Fig. 1. Fig. 3 is a lateral sectional elevation on the line 3 3 of Fig. 1. Fig. 4 is a detailed view showing a modification of the form of cam which may be employed. Fig. 5 is a sectional side elevation of a modified form of the invention, illustrating its application to a stairway; and Fig. 6 is a rear elevation, partly in section, of the modification shown in Fig. 5.

Like numerals refer to like parts throughout the several views.

In Figs. 1, 2, and 3 of the drawings I have shown at 10 a depressible platform set in an opening 11 in the main floor or passage 12. This platform 10 is held flush with the surface of the floor or passage 12 by means of the hinges 14, connecting one end thereof to the said floor in a manner which tends to cause the opposite or free end to drop down. To overcome this tendency and hold the free end of the said platform also normally flush with the floor-section adjoining, I employ a spring-support, as the bowed or semi-elliptical spring 15, attached at approximately its middle to the platform 10 and having its ends bearing upon suitable supports 16, beneath the said platform or the adjacent floor. The extent of depression of the free end of said platform 10 is limited by contact with the approximately cruciform cams or eccentrics 21, mounted on the shaft 18, extending laterally under said platform and journaled in suitable bearings 17. These cams 21 are so arranged as to preserve the proper balance of the platform, and to avoid undue wear from this contact face-plates or wear-blocks 22 are secured to the platform, against which the cams operate. The shaft 18 and the cams 21 carried thereby are continuously revolved by means of the pulley 19 and the driving-belt 20, so that simultaneously with the checking of the depression of the platform by contact of the face-plates 22 thereon with the cams 21 a violent vibratory motion will be imparted thereto by the rapidly-revolving cams. The extent of this vibration may be modified by the use of an eccentric having a continuous bearing periphery, as shown in Fig. 4.

Figure 6:
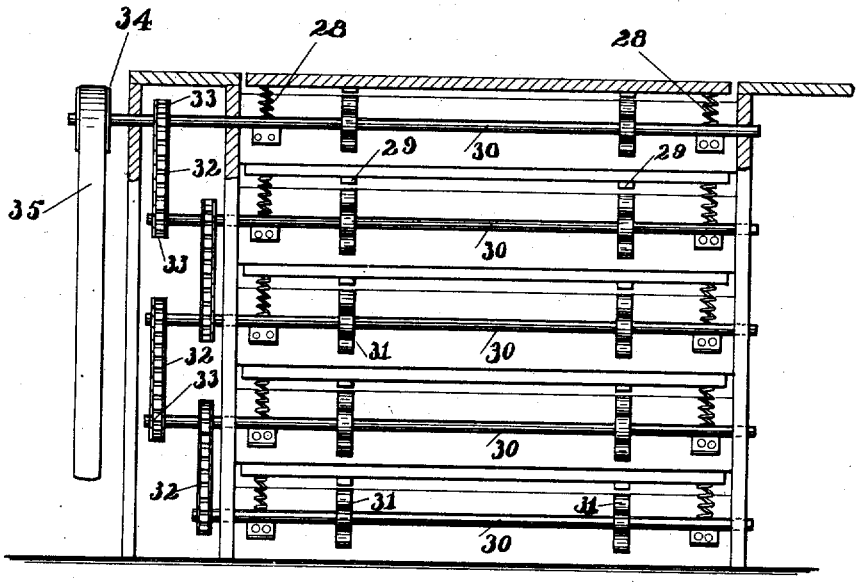

In the modification shown in Figs. 5 and 6 a similarly-arranged platform is shown as adapted to stairways. It comprises the treads 26, hinged to the bottom of the successive risers 27 and held normally at right angles thereto and out of contact with the cams or eccentrics 31 by means of suitable springs 28. In the drawings an expansive helical spring is shown; but it is obvious that the form of spring-support employed is immaterial. Each tread is provided with face-plates or wear-blocks 29 to contact with the cams beneath the respective treads. The cams 31 are mounted upon the revolving shafts 30, which are journaled in the stringers of the stairs. These shafts are driven by means of a pulley 34, mounted on one of them, and the power-belt 35, power being transmitted from this shaft to the others through the sprocket-wheels 33, mounted on each shaft, and the co-operating chain 32.

The essential features of construction, arrangement, and operation are the same whether applied to a floor, passage, or stairway, and they are such that the amusement device can be applied in any desired connection in a manner which will not attract the attention to its character. Normally the platform 10 or tread 20 is held flush with the surrounding floor or in the proper relation to the risers 27, the cams 21 or 31 revolving continuously beneath it, but out of contact with the face-plates or wear-blocks 22 or 29. When a person inadvertently steps upon the platform or tread, the same is depressed against the tension of the spring 15 or 28 until the face-plates thereon come into contact with the rapidly-revolving cams. This limits the extent of depression and simultaneously imparts a violent vibratory motion to the platform or tread and at the same time creates a great noise, much to the astonishment of the person and his subsequent amusement. The spring 15 or 28 acts to restore the platform or tread to its normal position in readiness for the next comer immediately upon its release from the weight upon it. If it be desired to modify the violence of the vibratory motion or the volume of sound, I use the form of cam as shown in Fig. 4, which accomplishes the desired result.

The construction of the device is such that none of the operating mechanism is exposed, and consequently neither the person nor apparel of any one passing over or upon it is endangered in any way.

It is not my intention to limit the invention to the precise construction shown and described herein, as it is obvious that there may be many deviations therefrom without departing from the spirit of the invention.

Having described my invention, what I claim as new, and desire to have protected by Letters Patent, is—

1. In an amusement device, a depressible platform and means normally out of contact therewith whereby the extent of depression thereof is limited and a vibratory motion is simultaneously imparted thereto.

2. In an amusement device, a depressible platform and continuously-revolving cams mounted thereunder and normally out of contact therewith whereby the extent of depression thereof is limited and a vibratory motion is simultaneously imparted thereto.

3. In an amusement device, a depressible platform, continuously-revolving cams mounted thereunder and a spring-support whereby said platform is normally held out of contact with said cams.

4. In an amusement device, a depressible platform hinged at one end to a relatively stationary member, a spring-support for the free end thereof and continuously-revolving cams mounted under said free end whereby the extent of depression thereof will be limited and a vibratory motion simultaneously imparted thereto.

5. In an amusement device, a depressible platform hinged at one end to a relatively stationary member, a spring-support for the free end thereof, cams mounted under said free end and means whereby said cams may be revolved to impart a vibratory motion to said platform simultaneously with the limitation of the depression thereof by contact with said cams.

6. In an amusement device, a depressible platform hinged at one end to a relatively stationary member, a spring-support for the free end thereof, a shaft extending laterally under said free end, cams mounted thereon, face-plates on said platform adapted to engage said cams and take up the wear thereof and means whereby said shaft may be revolved, substantially as described.

In witness whereof I have hereunto affixed my signature, this 24th day of September, 1901, in the presence of two witnesses.

GEORGE C. TILYOU.

Witnesses:
F. T. HEMPSTEAD,
F. T. WENTWORTH.